United States Patent [19]

Daussan et al.

[11] Patent Number: 5,176,873
[45] Date of Patent: Jan. 5, 1993

[54] METHOD FOR FORMING A LINING ON A METALLURGICAL VESSEL, A COMPOSITION AND A MACHINE FOR THE APPLICATION OF SAID METHOD

[75] Inventors: Jean-Charles Daussan, Metz; Gérard Daussan; André Daussan, both of Longeville-Les-Metz, all of France

[73] Assignee: Daussan et Compagnie, Woippy, France

[21] Appl. No.: 635,546

[22] PCT Filed: May 30, 1990

[86] PCT No.: PCT/FR90/00375
§ 371 Date: Jan. 14, 1991
§ 102(e) Date: Jan. 14, 1991

[87] PCT Pub. No.: WO90/14909
PCT Pub. Date: Dec. 13, 1990

[30] Foreign Application Priority Data
May 31, 1989 [FR] France .................. 89 07150

[51] Int. Cl.⁵ .............................................. C21B 13/00
[52] U.S. Cl. ................................... 266/44; 266/281
[58] Field of Search ............. 266/281, 44, 280, 275; 264/30

[56] References Cited

U.S. PATENT DOCUMENTS 3,876,354  4/1975  Kuita et al. ................... 425/110
4,117,052  9/1978  Florian ........................... 266/281
4,218,050  8/1980  Egli et al. ....................... 266/281
4,589,633  5/1986  Gilson et al. ................... 266/44

FOREIGN PATENT DOCUMENTS 1483584  10/1969  Fed. Rep. of Germany.
1927816  12/1970  Fed. Rep. of Germany.
2220163   9/1974  France.
1258608   9/1986  U.S.S.R..
1426135   2/1976  United Kingdom.

Primary Examiner—Scott Kastler
Attorney, Agent, or Firm—Young & Thompson

[57] ABSTRACT

The method for forming a lining on the internal faces (2) of a metallurgical vessel (1) for receiving molten metal involves the following steps:

a) at least one movable wall (3) is positioned at a predetermined distance from the internal face (2) of said vessel, b) a composition (4) containing at least one powdered refractory material is introduced between the face (2) of the vessel and the movable wall (3), c) said powdered material is heated so as to agglomerate at least that surface which is intended to come into contact with molten steel, d) said movable wall (3) is displaced and the aforementioned steps are repeated in order to obtain a continuous lining on the internal faces of the vessel.

20 Claims, 2 Drawing Sheets

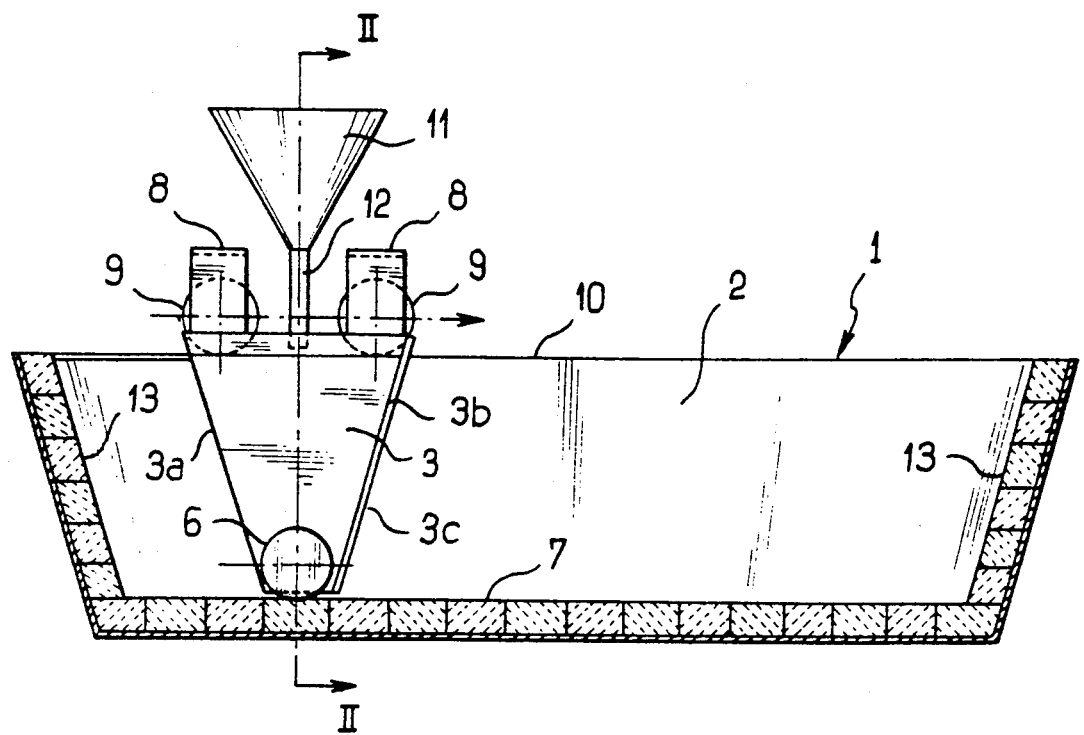
FIG_1
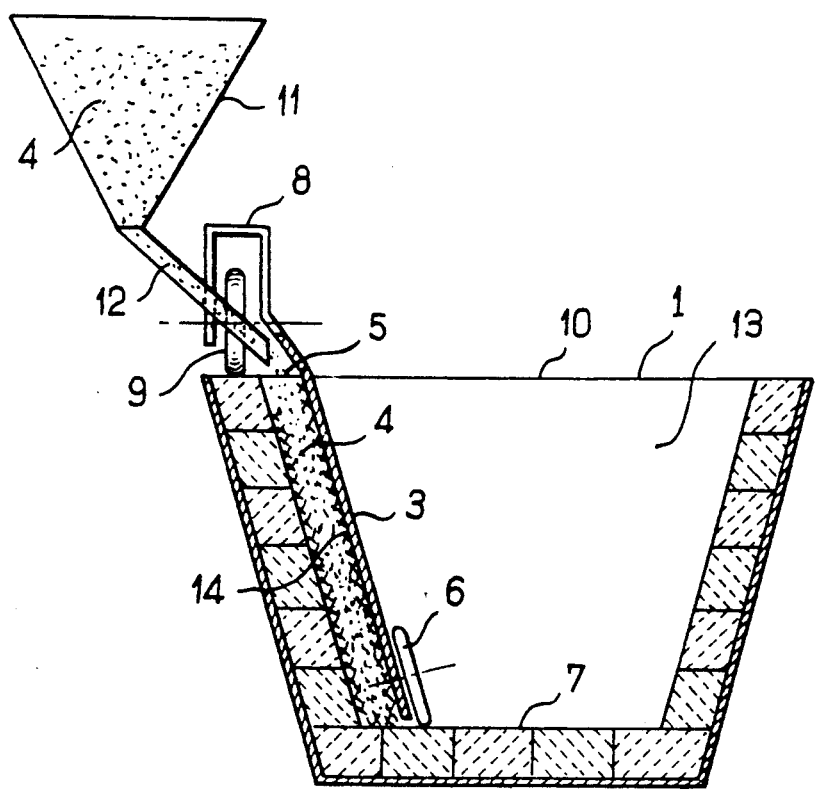
FIG_2

METHOD FOR FORMING A LINING ON A METALLURGICAL VESSEL, A COMPOSITION AND A MACHINE FOR THE APPLICATION OF SAID METHOD

FIELD OF THE INVENTION

The present invention relates to a method for forming a lining on the internal faces of a metallurgical vessel such as a tundish or a casting ladle in order to protect the vessel wall or its permanent refractory lining.

The invention is also directed to the composition used to form the lining aforesaid.

The invention is also concerned with a machine for carrying out the method aforesaid.

BACKGROUND OF THE INVENTION

In the majority of instances, the protective lining considered in the foregoing is currently applied on the internal faces of a metallurgical vessel by spraying a slurry consisting of a mixture of refractory materials, fibers and a binder.

This method proves wholly satisfactory but suffers from the disadvantage of covering the internal faces of the vessel with a lining containing a considerable quantity of water which has to be subsequently eliminated by means of a long and costly drying operation.

There is also known a method which consists in pouring the lining composition into the space located between the internal faces of a metallurgical vessel and a mold of substantial size which is placed within this latter.

This mold is equipped with preheating means and valves through which air is permitted to escape while the composition is being blown into the space mentioned above.

The use of a mold of this type is not only complicated and costly but also results in excessive consumption of composition in order to form the lining since the walls of the mold are smooth whilst those of the permanent lining have hollows and bumps, especially when it is worn.

The aim of the present invention is to overcome the disadvantages of known methods.

SUMMARY OF THE INVENTION

In accordance with the invention, the method for forming a lining on the internal faces of a metallurgical vessel which is intended to receive molten metal essentially involves the following steps:
a) at least one movable wall is positioned at a predetermined distance from the internal face of said vessel;
b) a composition containing at least one powdered refractory material is introduced between the internal face of the vessel and the movable wall;
c) said powdered material is heated so as to agglomerate at least the surface which is intended to come into contact with the molten steel;
d) said movable wall is displaced and the aforementioned steps are repeated so as to obtain a continuous lining on the internal faces of the vessel.

A movable wall of this type is much simpler and less costly to construct than the molds of large size which have been employed up to the present time.

Moreover, this movable wall can be displaced by making use of means which develop low power and therefore achieve an economy of energy.

Moreover, said movable wall makes it possible to check the thickness of the lining with accuracy while thus preventing any overthickness and any wasteful consumption of the initial composition.

In accordance with an advantageous embodiment of the invention, the powdered composition is introduced either by hand between said internal face and said movable wall or by means of a device for providing a constant supply between said face and said wall as the movable wall advances.

In accordance with a preferred embodiment of the invention, heating of the powdered material is carried out by preheating said internal face and/or said movable wall to the vicinity of 190° C. to 500° C. in the case of practically dry compositions, then to 900° C. if the composition contains water of crystallization or of rehydration or if decarbonation of certain refractory materials is necessary.

Preferably, said powdered refractory material is selected from the following materials: silica, alumina, magnesia, chrome-magnesia, raw dolomite, baked dolomite, calcite, lime, chromium oxide, zirconium silicate, alumino-silicates and their mixtures.

The composition can contain in addition a binder selected from the mineral, organic, hydraulic binders and their mixtures.

According to another aspect of the invention, the machine for carrying out the method in accordance with the invention comprises at least one movable wall which is capable of displacement along an internal face of the vessel and forms with said face a space of substantially constant thickness corresponding to that of the lining to be formed and means for introducing into said space the powdered composition of the lining to be formed.

Preferably, said movable wall extends over substantially the full height of the vessel face and its lateral edges are shaped so as to correspond to the shape of the end faces of the vessel.

Said movable wall is preferably provided with heating means which are sufficient to form a hard crust on the surface of the powdered composition which is adjacent to said movable wall, even if the vessel itself is not of the heating type.

The heating means associated with the movable wall thus make it possible to heat the composition located opposite to said wall until the formation of a surface crust which has hardened or polymerized to a sufficient extent in order to ensure cohesion of the lining, with the result that it is subsequently possible to displace the wall in order to form just next to the portion of lining which has already formed another portion of lining which extends the previous portion without any discontinuity.

BRIEF DESCRIPTION OF THE DRAWINGS

Further characteristic features and advantages of the invention will become apparent from the description which now follows, reference being made to the accompanying drawings which are given by way of non-limitative example and in which:

FIG. 1 is a longitudinal sectional view of a tundish in which is placed a machine for applying a protective lining in accordance with the invention;

FIG. 2 is a sectional view to a larger scale, this view being taken along the plane II—II of FIG. 1;

DETAILED DESCRIPTION OF THE INVENTION

Figure 3:
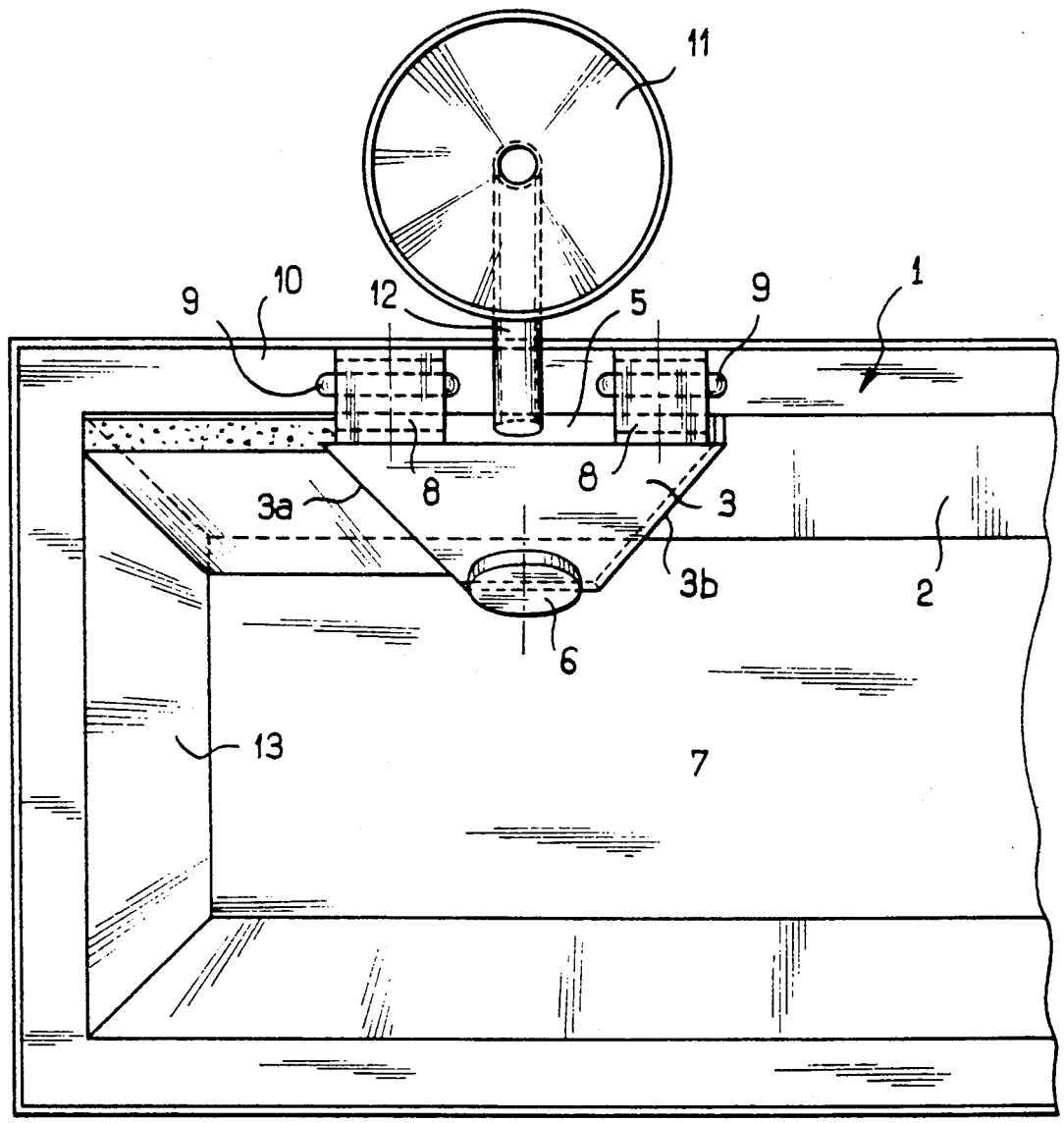
FIG. 3 is a fragmentary plan view of the tundish showing the top of the machine.

As shown in the accompanying drawings the method for forming a lining on the internal lateral faces 2 of a metallurgical vessel 1 for receiving molten metal involves the following steps:
a) a movable wall 3 is positioned at a predetermined distance from the internal face 2 of said vessel,
b) a composition 4 containing at least one powdered refractory material is introduced between the face 2 of the vessel 1 and the movable wall 3,
c) said powdered material is heated so as to agglomerate at least that surface which is intended to come into contact with molten steel,
d) said movable wall 3 is displaced and the aforementioned steps are repeated in order to obtain a continuous lining on said faces of the vessel 1.

The powdered composition 4 is introduced either by hand between said internal face and said movable wall 3 or by means of a device for providing a constant supply between said face and said wall as the movable wall 3 advances.

The powdered material 4 is heated by preheating said internal face 2 and/or said movable wall 3 to the vicinity of 190° C. to 500° C. in the case of practically dry compositions, then to 900° C. if the composition contains water of crystallization or of rehydration or if decarbonation of certain refractory materials is necessary, or else to the vicinity of 1300° C. if it is desired to pour into a hot vessel.

The powdered refractory material 4 is selected from the following materials: silica, alumina, magnesia, chrome-magnesia, raw dolomite, baked dolomite, calcite, lime, chromium oxide, zirconium silicate, silico-aluminates and their mixtures.

Preferably, the composition 4 also contains a binder selected from the mineral, organic, hydraulic binders and their mixtures. The powdered refractory material can be calibrated in a very broad particle-size class and can be pre-coated by means of at least one binder.

The powdered material can have the following composition by weight:
powdered refractory material: 60 to 100%
binder (cement and/or silicate and/or resin: 0 to 20%
carbonaceous material: 0 to 20%.

For example, the composition can contain:
20 to 0.5%, preferably 4%, of binder (phenolic resin and/or silicate and/or cement)
20 to 0%, preferably 1.5%, of weight-reduction products such as, for example, fine sawdust and/or particles of paper,
99.5 to 60%, preferably 94.5%, of refractory grains such as silica grains, for example.

The composition in this example has a density of 1.10 to 1.40 approximately.

The composition can also be as follows:
0 to 20% of binder, preferably 4%
0 to 20% of weight-reduction products such as, for example, fine sawdust and/or particles of paper, preferably 1%
0 to 5% of lubricant (for example stearate), preferably 0.5%
0 to 5% of boric acid, preferably 1%
100 to 50% of magnesia and/or silica and/or alumina and/or dolomite and/or lime and/or calcite and/or sulfate and/or phosphate and/or zircon, preferably 93.5%, the density of the composition in this case being within the range of 1.6 to 2.2 approximately.

The machine in accordance with the invention has at least one movable wall 3 which is capable of displacement along an internal face 2 of the vessel 1 and forms with said face a space 5 (as shown in FIG. 2) having a substantially constant thickness corresponding to that of the lining to be formed and means for introducing within said space 5 the powdered composition 4 of the lining to be formed.

It is apparent from FIGS. 1 to 3 that the wall carries at its lower end a runner-wheel 6 which bears on the bottom wall 7 of the vessel 1 so that said end of the wall 3 is practically in contact with said bottom wall 7.

The upper end of the movable wall 3 is adapted to carry two yokes 8 within which are rotatably mounted runner-wheels 9 which bear on the top edge 10 of the vessel.

A hopper 11 which contains the powdered material 4 is located above the movable wall 3 and carries a pipe 12 at its lower end. Said pipe has its opening above the space 5 which is located between the face 2 of the vessel and the movable wall 3.

Said hopper 11 is capable of moving at the same time as the movable wall 3 between the two end faces 13 of the vessel 1.

The movable wall 3 extends over substantially the full height of the lateral face 2 of the vessel 1 and its lateral edges 3a, 3b (as shown in FIG. 1) are so shaped as to correspond to the shape of the end faces 13 of the vessel. Thus, when the edge 3a, 3b comes into contact with an end face 13, said edge forms a substantially leak-tight joint with said face 13.

The edge 3b of the wall 3 has a flange 3c (as shown in FIG. 3) which substantially closes the space 5 formed between the wall 3 and the face 2, thus preventing any leakage of powdered material through said edge 3b.

Moreover, the movable wall 3 is provided with heating means (not shown) which are sufficient to form a hard crust 14 (as shown in FIG. 2) on that surface of the powdered composition 4 which is adjacent to said movable wall 3, even if the vessel itself is not of the heating type or preheated type. Said hard crust is formed by chemical bonding (silicate, for example) and/or by hydraulic bonding (cement, for example) and/or by ceramic bonding (sintering, for example) and/or by polymerization (resin, for example) of the powdered material.

The aforementioned heating means can consist of electric resistors or a gas-heated device carried by the movable wall 3.

A preheater which can be attached (but preferably not rigidly fixed) to the vessel 1 is capable of uniformly preheating said vessel to a temperature of at least 110° C. right through so as to solidify the composition 4 which is intended to form the lining, even if the movable wall 3 is not a heating wall.

The movable wall 3 is preferably paired with a wall which is capable of displacement on the opposite side of the vessel in the same direction or in the opposite direction, thus making it possible to form a protective lining on both longitudinal faces 2 at the same time.

Displacement of the movable wall 3 (or of both walls) can be controlled by means of a robot.

The machine is provided in addition and preferably with a device for spreading and/or compacting the composition 4 which is intended to form the lining located on the bottom wall 7 of the vessel.

The device for spreading and/or compacting the composition 4 on the bottom wall 7 of the vessel 1 (by pneumatic means, for example) comprises heating means which serve to solidify said composition, especially when the vessel 1 is in the cold state. This composition can also be spread over the bottom wall of the vessel by hand.

A point worthy of note is that, in particular in the zone located above the steel bath, there is a potential danger of friability of the lining as a result of destruction of the organic binder by radiant heat. This handicap can be overcome by the presence of a complementary mineral binder in the analysis of said lining (silicate, for example).

Should it be found necessary to pour into a hot vessel, especially for certain grades of steel, the above-mentioned danger of friability applies to the entire lining and it proves necessary in this case to preheat the vessel to the vicinity of:

1200° C. in the case of a basic mixture,
1300°/1350° C. in the case of a siliceous mixture,
1200° C. in the case of a dolomitic mixture and/or a mixture having a base of lime and/or a calcite-base mixture and/or a hydroxide-base mixture, in order to obtain ceramic bonding of the entire lining (by sintering).

As can readily be understood, the invention is not limited to the example of execution which has just been described and any number of modifications may accordingly be contemplated without thereby departing either from the scope or the spirit of the invention.

We claim:

1. A method for forming a protective lining on internal faces (2) of a metallurgical vessel (1) adapted to receive molten metal, which comprises the following steps:
   a) positioning at least one movable wall (3) extending substantially over the full height of said faces at a predetermined distance from an internal face (2) of said vessel,
   b) introducing a powdered composition (4) containing at least one powdered refractory material between the internal face (2) of the vessel ad the movable wall (3),
   c) heating said powdered composition so as to sinter said internal face adapted to receive said molten metal,
   d) transversely displacing said movable wall (3) along and with respect to said faces and to said composition already in place thereon, and repeating the above steps so as to obtain a continuous lining on said internal faces of the vessel.

2. A method in accordance with claim 1, wherein the powdered composition (4) is introduced between said internal face and said movable wall (3) either manually, or by means of a device for providing a constant supply between said face (2) and said wall (3) as the movable wall (3) advances.

3. A method in accordance with claim 1, wherein the powdered composition introduced (4) is substantially dry and is heated by preheating either said internal face (2) or said movable wall (3) to a temperature ranging from 190° C. to 500° C.

4. A method in accordance with claim 1, wherein the powdered composition introduced (4) contains water of crystallization or of rehydration and is heated by preheating either said internal face (2) or said movable wall (3) to a temperature of about 900° C.

5. A method in accordance with claim 1, wherein the powdered composition introduced (4) is heated by preheating either said internal face (2) or said movable wall (3) to a temperature of at least 1200° C. so as to achieve ceramic bonding of the lining by sintering.

6. A method in accordance with claim 1, wherein the powdered refractory material is selected from the group consisting of silica, alumina, magnesia, chrome-magnesia, raw dolomite, baked dolomite, calcite, lime, chromium oxide, zirconium silicate, alumino-silicates and mixtures thereof.

7. A method in accordance with claim 6, wherein the composition additionally contains a binder selected from the group consisting of mineral, organic, hydraulic binders and mixtures thereof.

8. A method in accordance with claim 7, wherein the composition has the following percentages by weight:
   powdered refractory material; 60 to 100%
   binder: 0 to 20%
   carbonaceous material: 0 to 20%

9. A method in accordance with claim 7, wherein the composition has the following percentages by weight:
   20 to 0.5% of binder,
   20 to 0% of weight-reduction products selected from sawdust, paper particles, mineral fibers and organic fibers,
   99.5% to 60% of refractory grains,
   said composition having a density ranging from about 1.10 to 1.40.

10. A method in accordance with claim 9, wherein the composition contains by weight: 4% of binder, 1.5% of weight-reduction products, and 94.5% of refractory grains.

11. A method in accordance with claim 7, wherein the composition has the following percentages by weight:
   0 to 20% of binder,
   0 to 20% of weight-reduction products selected from sawdust and paper particles,
   0 to 5% of a lubricant,
   0 to 5% of boric acid,
   100 to 50% of a refractory material comprising magnesia, silica, alumina, dolomite, lime, calcite, sulfate, phosphate, or zircon,
   said composition having a density ranging from about 1.6 to about 2.2.

12. A method in accordance with claim 11, wherein the composition contains by weight: 4% of binder, 1.0% of weight-reduction products, 0.5% of lubricant, 1% of boric acid, and 93.5% of a refractory material.

13. A machine for forming a protective lining on an internal face of a metallurgical vessel, comprising: at least one movable wall (3), means for displacing said wall along an internal face (2) of the vessel (1), said wall (3) forming with said face a space (5) having a substantially constant thickness corresponding to that of the lining to be formed, and means for introducing within said space (5) a powdered composition of the lining to be formed, said movable wall (3) extending over substantially the full height of said vessel face.

14. A machine in accordance with claim 13, wherein the movable wall (3) has lateral edges (3a, 3b) which are shaped so as to correspond to the shape of end faces (13) of the vessel.

15. A machine in accordance with claim 13, wherein said movable wall (3) includes heating means.

16. A machine in accordance with claim 13, further including a preheater attached to the vessel (1).

17. A machine in accordance with claim 13, wherein the movable wall (3) is paired with a second wall, said second wall adapted to be displaced on the opposite side of the vessel in the same direction or in the opposite direction.

18. A machine in accordance with claim 13, further including a robot for displacing the movable wall.

19. A machine in accordance with claim 13, further including a device for spreading and compacting the composition on the bottom wall of the vessel.

20. A machine in accordance with claim 19, wherein the device for spreading and compacting the composition on the bottom wall (7) of the vessel, comprises pneumatic means having heating means which serve to solidify said composition, wherein the vessel (1) is in a cold state.

* * * * *